US008892220B2

(12) United States Patent
Kotb et al.

(10) Patent No.: US 8,892,220 B2
(45) Date of Patent: Nov. 18, 2014

(54) SELF-CONTAINED, WEARABLE LIGHT CONTROLLER WITH WIRELESS COMMUNICATION INTERFACE

(75) Inventors: Miral Kotb, Houston, TX (US); Alan Grow, Brooklyn, NY (US)

(73) Assignee: Iluminate LLC, Miami Beach, FL (US)

( * ) Notice: Subject to any disclaimer, the term of this patent is extended or adjusted under 35 U.S.C. 154(b) by 433 days.

(21) Appl. No.: 13/132,831

(22) PCT Filed: Sep. 29, 2010

(86) PCT No.: PCT/US2010/050734
§ 371 (c)(1),
(2), (4) Date: Jun. 3, 2011

(87) PCT Pub. No.: WO2011/041423
PCT Pub. Date: Apr. 7, 2011

(65) Prior Publication Data
US 2012/0078393 A1 Mar. 29, 2012

(51) Int. Cl.
*G05B 15/02* (2006.01)
*G05B 19/18* (2006.01)
*G05B 11/01* (2006.01)
*H05B 37/02* (2006.01)
*A41D 27/08* (2006.01)

(52) U.S. Cl.
CPC .......... *H05B 37/0272* (2013.01); *A41D 27/085* (2013.01)
USPC ........ 700/19; 700/17; 700/9; 700/20; 700/83; 362/84; 362/85; 362/103

(58) Field of Classification Search
None
See application file for complete search history.

(56) References Cited

U.S. PATENT DOCUMENTS 3,549,878 A 12/1970 Bailey
4,164,008 A 8/1979 Miller et al.
4,633,141 A 12/1986 Weber
4,875,144 A 10/1989 Wainwright (Continued)

FOREIGN PATENT DOCUMENTS

KR 20-0266142 2/2002
KR 10-2009-0001342 1/2009
WO WO 2004/036891 A2 † 4/2004
WO 2005-096809 10/2005

OTHER PUBLICATIONS

Eaton, K., "Why Your Future Clothes Will Be Stuffed with Electronics", Feb. 2009, Retrived from the Internet on Mar. 27, 2013 at "www.fastcompany.com".*

(Continued)

*Primary Examiner* — Mohammad Ali
*Assistant Examiner* — Kelvin Booker
(74) *Attorney, Agent, or Firm* — Ostrager Chong Flaherty & Broitman P.C.

(57) ABSTRACT

A system for controlling a plurality of wearable wireless light-bearing units is disclosed. The light-bearing units may comprise lighting elements coupled to garments such as those used in the performing arts and entertainment. The system comprises a control unit wirelessly communicating with light-bearing units. The light-bearing units comprise a control box coupled to a plurality of lights. Operators can control one or more of the light-bearing units in synchrony with each other and with other audio-visual elements using standard protocols. The device also provides a library of preprogrammed effects and can perform self-diagnostic functions.

19 Claims, 9 Drawing Sheets

(56) References Cited

U.S. PATENT DOCUMENTS

| | | | | |
|---|---|---|---|---|
| 4,980,809 | A | 12/1990 | Baldwin et al. | |
| 5,019,438 | A | 5/1991 | Rapisarda | |
| 5,209,560 | A | 5/1993 | Taylor et al. | |
| 5,329,431 | A | 7/1994 | Taylor et al. | |
| 5,461,188 | A * | 10/1995 | Drago et al. | 362/103 |
| 5,555,490 | A | 9/1996 | Carroll | |
| 6,116,745 | A | 9/2000 | Yei | |
| 6,243,870 | B1 | 6/2001 | Graber | |
| 6,300,727 | B1 | 10/2001 | Bryde et al. | |
| 6,324,053 | B1 | 11/2001 | Kamijo | |
| 6,380,923 | B1 * | 4/2002 | Fukumoto et al. | 345/156 |
| 6,381,482 | B1 | 4/2002 | Jayaraman et al. | |
| 6,517,216 | B1 | 2/2003 | Cercone et al. | |
| 6,548,967 | B1 | 4/2003 | Dowling et al. | |
| 6,563,424 | B1 | 5/2003 | Kaario | |
| 6,801,003 | B2 | 10/2004 | Schanberger et al. | |
| 6,809,652 | B1 | 10/2004 | Baxter et al. | |
| 6,834,395 | B2 † | 12/2004 | Fuentes | |
| 6,843,578 | B1 | 1/2005 | Cheung | |
| 6,848,803 | B2 | 2/2005 | Spongberg | |
| 6,895,261 | B1 | 5/2005 | Palamides | |
| 6,935,761 | B2 * | 8/2005 | Vanderschuit | 362/106 |
| 6,964,493 | B1 | 11/2005 | Whitlock | |
| 7,027,736 | B1 | 4/2006 | Mier-Langner et al. | |
| 7,052,154 | B2 | 5/2006 | Vanderschuit | |
| 7,077,538 | B2 * | 7/2006 | Wooldridge | 362/103 |
| 7,088,220 | B2 * | 8/2006 | Kotzin | 340/5.82 |
| 7,102,902 | B1 | 9/2006 | Brown et al. | |
| 7,111,956 | B2 * | 9/2006 | Brown | 362/106 |
| 7,126,291 | B2 | 10/2006 | Kruse et al. | |
| 7,144,127 | B2 | 12/2006 | Golle et al. | |
| 7,144,830 | B2 * | 12/2006 | Hill et al. | 442/205 |
| 7,315,135 | B2 | 1/2008 | Kang et al. | |
| 7,564,426 | B2 † | 7/2009 | Poor et al. | |
| 7,572,028 | B2 * | 8/2009 | Mueller et al. | 362/227 |
| 7,592,276 | B2 * | 9/2009 | Hill et al. | 362/103 |
| 7,622,664 | B2 * | 11/2009 | Uehara | 84/609 |
| 7,748,878 | B2 | 7/2010 | Lee | |
| 7,942,543 | B2 * | 5/2011 | Ritter | 362/103 |
| 8,099,289 | B2 * | 1/2012 | Mozer et al. | 704/275 |
| 8,179,246 | B2 * | 5/2012 | Lee et al. | 340/463 |
| 8,195,467 | B2 * | 6/2012 | Mozer et al. | 704/275 |
| 8,696,459 | B2 * | 4/2014 | Zhang | 463/36 |
| 2003/0211797 | A1 * | 11/2003 | Hill et al. | 442/205 |
| 2003/0213045 | A1 * | 11/2003 | Fuentes | 2/69 |
| 2004/0009729 | A1 * | 1/2004 | Hill et al. | 442/208 |
| 2004/0156215 | A1 * | 8/2004 | Wooldridge | 362/570 |
| 2004/0186737 | A1 * | 9/2004 | Roberts | 705/1 |
| 2004/0187184 | A1 † | 9/2004 | Rubin et al. | |
| 2004/0257196 | A1 * | 12/2004 | Kotzin | 340/5.52 |
| 2004/0264173 | A1 * | 12/2004 | Vanderschuit | 362/103 |
| 2004/0264176 | A1 * | 12/2004 | Vanderschuit | 362/106 |
| 2005/0013128 | A1 * | 1/2005 | Worthington | 362/108 |
| 2005/0113167 | A1 * | 5/2005 | Buchner et al. | 463/30 |
| 2005/0152142 | A1 * | 7/2005 | Traynor | 362/103 |
| 2006/0215393 | A1 * | 9/2006 | VanderSchuit | 362/106 |
| 2006/0221597 | A1 | 10/2006 | Hutchinson | |
| 2007/0049147 | A1 * | 3/2007 | Hill et al. | 442/181 |
| 2007/0221049 | A1 | 9/2007 | Harris | |
| 2007/0268680 | A1 | 11/2007 | Lee | |
| 2007/0291473 | A1 * | 12/2007 | Traynor | 362/106 |
| 2008/0060503 | A1 * | 3/2008 | Uehara | 84/609 |
| 2008/0089056 | A1 * | 4/2008 | Grosjean | 362/103 |
| 2008/0136775 | A1 * | 6/2008 | Conant | 345/156 |
| 2008/0282437 | A1 * | 11/2008 | Park | 2/1 |
| 2009/0131165 | A1 * | 5/2009 | Buchner et al. | 463/30 |
| 2009/0150158 | A1 * | 6/2009 | Becker et al. | 704/270 |
| 2009/0153477 | A1 * | 6/2009 | Saenz | 345/158 |
| 2009/0190345 | A1 | 7/2009 | Belliveau et al. | |
| 2009/0190346 | A1 | 7/2009 | Belliveau et al. | |
| 2009/0204409 | A1 * | 8/2009 | Mozer et al. | 704/275 |
| 2009/0204410 | A1 * | 8/2009 | Mozer et al. | 704/275 |
| 2009/0213572 | A1 * | 8/2009 | Benson et al. | 362/183 |
| 2009/0225542 | A1 | 9/2009 | Belliveau | |
| 2009/0241171 | A1 * | 9/2009 | Sunwoo et al. | 726/3 |
| 2009/0310290 | A1 * | 12/2009 | Tennent | 361/679.03 |
| 2010/0123385 | A1 * | 5/2010 | Perera et al. | 313/502 |
| 2010/0130812 | A1 | 5/2010 | Martel | |
| 2010/0217413 | A1 * | 8/2010 | Seiler | 700/94 |
| 2010/0309009 | A1 * | 12/2010 | Lee et al. | 340/665 |
| 2010/0313335 | A1 * | 12/2010 | Waters | 2/209.13 |
| 2012/0183940 | A1 * | 7/2012 | Aragones et al. | 434/247 |
| 2012/0210489 | A1 * | 8/2012 | Abreu | 2/69 |
| 2012/0225718 | A1 * | 9/2012 | Zhang | 463/31 |
| 2012/0317024 | A1 * | 12/2012 | Rahman et al. | 705/42 |
| 2012/0330387 | A1 * | 12/2012 | Ferraz Rigo et al. | 607/90 |
| 2013/0111651 | A1 * | 5/2013 | Waters | 2/209.13 |
| 2013/0128022 | A1 * | 5/2013 | Bose et al. | 348/77 |
| 2013/0192961 | A1 * | 8/2013 | Waters | 200/43.18 |
| 2013/0201299 | A1 * | 8/2013 | Waters | 348/49 |
| 2013/0221874 | A1 * | 8/2013 | Haney et al. | 315/297 |
| 2014/0015470 | A1 * | 1/2014 | Lim et al. | 320/101 |
| 2014/0049487 | A1 * | 2/2014 | Konertz et al. | 345/173 |
| 2014/0070957 | A1 * | 3/2014 | Longinotti-Buitoni et al. | 340/870.01 |

OTHER PUBLICATIONS

Fallon, S., "iLuminate Wearable Light System Debuts", Jun. 29, 2010, Retrieved from the Internet on Mar. 27, 2013 at "www.fashionablygeek.com".*

International Preliminary Report on Patentability in corresponding International Application No. PCT/US2010/050734 dated Apr. 12, 2012.

"Philips showcases production-ready Lumalive textile garments," Aug. 24, 2006, http://phys.org/news75654944.html.†

"'Lumalive' photonic textiles: Philips turns fabrics into intelligent displays," Sep. 22, 2006, http://macdailynews.com/2006/09/22/lumalive_photonic_textiles_philips_turns_fabrics_into_intelligent_displays/.†

"Wearable electronics and photonics," Edited by Xiaoming Tao, 2005, Woodhead Publishing Ltd and CRC Press LLC.†

"Full Focus Inc. Wireless DMX EL and LED Wire Costume Pack," Mar. 7, 2013 or before, http://www.fullfocusonline.com/collections/wireless-led-costumes/products/copy-of-wireless-led-costume-pack, http://www.fullfocusonline.com/collections/wireless-led-costumes/products/wireless-led-costume-pack.†

Theatrewireless, "Wireless lights for costumes," Feb. 11, 2005, http://groups.yahoo.com/group/TheCostumersManifesto/message/6196.†

Hanlon, Mike, "France Telecom develops flexible display clothing," Mar. 7, 2013 or before, http://www.gizmag.com/go/3043/.†

Illuminated Clothing Co., "Combining Fabric with Bendable Electronic Circuits," May 7, 2008, Smart Fabrics Conference, Charleston, NC.†

"The City Theatrical WDS Wireless Dimming System," Mar. 3, 2004, http://livedesignonline.com/news/show_business_city_theatrical_wds.†

Hanlon, Mike, "Photonic textiles—fabric becomes an intelligent display," Sep. 1, 2005, http://www.gizmag.com/go/4527/.†

* cited by examiner
† cited by third party

| | Block 1 (0:04) | Block 2 (0:06) | Block 3 (0:08) | Block 4 (0:10) | Block 5 (0:12) | Block 6 (0:14) | Block 7 (0:16) | Block 8 (0:18) |
|---|---|---|---|---|---|---|---|---|
| Garment 1 (10.0.0.101) | A (Broadcast) | A (Broadcast) | B | D | A | A | B | D |
| Garment 2 (10.0.0.102) | A (Broadcast) | A (Broadcast) | B | A | A | A | B | A |
| Garment 3 (10.0.0.103) | A (Broadcast) | A (Broadcast) | B | A | A | A | B | A |
| Garment 4 (10.0.0.104) | A (Broadcast) | A (Broadcast) | C | B | B | B | C | B |

FIG. 6A

| | | | | |
|---|---|---|---|---|
| Pattern A | | | Pattern C | |
| Lighting Element 1 | Brightness 50 | | Lighting Element 1 | Strobe |
| Lighting Element 2 | Brightness 150 | | Lighting Element 2 | Strobe |
| Lighting Element 3 | Brightness 50 | | Lighting Element 3 | Strobe |
| Lighting Element 4 | Strobe | | Lighting Element 4 | Strobe |
| Pattern B | | | Pattern D | Play pre-recorded sequence 005 |
| Lighting Element 1 | Off | | Lighting Element 1 | No instructions – garment control box plays sequence 005 |
| Lighting Element 2 | Off | | Lighting Element 2 | No instructions – garment control box plays sequence 005 |
| Lighting Element 3 | Brightness 255 | | Lighting Element 3 | No instructions – garment control box plays sequence 005 |
| Lighting Element 4 | Brightness 255 | | Lighting Element 4 | No instructions – garment control box plays sequence 005 |

FIG. 6B

702

DMX Data

| | Bytes 0-9 | Bytes 10-19 | Bytes 20-29 | Bytes 30-39 | Bytes 40-49 | Bytes 50-59 |
|---|---|---|---|---|---|---|
| Data: | 15, 35, 19, 209, … | 48, 193, 209, 1, … | 85, 192, 105, 38, … | 68, 109, 205, 186, … | 75, 90, 105, 200, … | 101, 100, 64, 50, … |

706 706 708

704

Translated Commands

| | Bytes 0-9: Broadcast Enable | Bytes 10-19: Broadcast | Bytes 20-29: Garment 1 | Bytes 30-39: Garment 2 | Bytes 40-49: Garment 3 | Bytes 50-59: Garment 4 |
|---|---|---|---|---|---|---|
| Commands: | Indicates enable broadcast for first 2 garments | Lighting Element 1: Brightness: 50<br>Lighting Element 2: Brightness: 129<br>Etc… | Unused Data (Garment 1 receives broadcast commands) | Unused Data (Garment 2 receives broadcast commands) | Lighting Element 1: Brightness: 50<br>Lighting Element 2: Brightness: 129<br>Etc… | Play Pre-programmed sequence 003 |

706 706 708

FIG. 7

802

804

| Actual Time | 0:00 | 0:02 | 0:04 | 0:06 | 0:08 | 0:10 | 0:12 | 0:14 |
|---|---|---|---|---|---|---|---|---|
| SMPTE Timecode | 0:04 | 0:04 | 0:04 | 0:04 | 0:10 | 0:12 | 0:04 | 0:04 |

806

808

| | 0:04 | 0:04 | 0:04 | 0:04 | 0:10 | 0:12 | 0:04 | 0:04 |
|---|---|---|---|---|---|---|---|---|
| Garment 1 (10.0.0.101) | A (Broadcast) | A (Broadcast) | A (Broadcast) | A (Broadcast) | D | A | A (Broadcast) | A (Broadcast) |
| Garment 2 (10.0.0.102) | A (Broadcast) | A (Broadcast) | A (Broadcast) | A (Broadcast) | A | A | A (Broadcast) | A (Broadcast) |
| Garment 3 (10.0.0.103) | A (Broadcast) | A (Broadcast) | A (Broadcast) | A (Broadcast) | A | A | A (Broadcast) | A (Broadcast) |
| Garment 4 (10.0.0.104) | A (Broadcast) | A (Broadcast) | A (Broadcast) | A (Broadcast) | B | B | A (Broadcast) | A (Broadcast) |

810

FIG. 8

SELF-CONTAINED, WEARABLE LIGHT CONTROLLER WITH WIRELESS COMMUNICATION INTERFACE

This application is the U.S. National Stage of International Application No. PCT/US2010/050734 filed Sep. 29, 2010, which claims priority to U.S. Provisional Application No. 61/247,157 filed Sep. 30, 2009, both applications of which are incorporated-by-reference herein in their entireties.

FIELD OF INVENTION

The present invention generally relates to wireless light control systems and methods that control a plurality of light units remotely via Internet protocols and, more particularly, to a wearable light unit that provides a broad array of remotely controlled lighting effects.

BACKGROUND OF THE INVENTION

As used herein, a "wearable" light unit refers to a light unit that is lightweight, self-contained and capable of attachment to or incorporation into garments, such as shirts, pants, shoes, hats, gloves and the like, or attachment to a person's body, such as in the form of eyeglasses or a head band, while providing the desired visual effect. A "wearable" light unit should afford a user natural, comfortable and unrestricted movement, and be durable even when the user is engaged in sudden or intense movements.

Clothing incorporating light-producing elements can greatly enhance the experience for viewers. At a rock concert, for instance, stunning visual effects produced by lighted costumes can draw attention to the performers even at a considerable distance.

Due to a unique set of constraints, it has not been possible through prior art to control lighted garments with all the tools and protocols used to control conventional lighting fixtures. It is desirable to have a device that can provide such control in order to bring a lighted garment into synchrony with its environment: with scene lighting, with music, with other lighted garments, and so on. Such a device is also desirable because it enables other interactive scenarios not possible with prior art devices.

Methods of constructing lighted garments independent of an electronic control device are well-known. U.S. Pat. No. 4,164,008 and U.S. Pat. No. 5,019,438 disclose methods of embedding light-emitting elements and their supporting electronics into clothing. U.S. Pat. No. 6,848,803 discloses the use of optical tubing to convey light from a central source to various exit points in a garment. U.S. Pat. No. 6,964,493 discloses a method of affixing lighting elements to a garment in a way that permits easy washing of the garment, while U.S. Pat. No. 7,144,127 discloses a safety vest with embedded electroluminescent (EL) strips. Methods of powering EL wires from a low voltage DC power source are disclosed in U.S. Pat. No. 4,633,141 (Motorola). Methods of powering and dimming LEDs suitable for us with low voltage power sources are disclosed for instance in U.S. Pat. No. 7,315,135.

Certain specialized control systems for lighted apparel are also known in the art. U.S. Pat. No. 4,875,144 and U.S. Pat. No. 6,116,745 disclose different methods for creating illuminated animations in a garment using minimal electronic control circuitry. U.S. Pat. No. 6,843,578 discloses a method of controlling lighted clothing, in particular footwear, via a combination of sensors which react to light, movement, and orientation. These prior art devices aim to make lighted apparel more engaging for the viewer by varying the light produced according to preprogrammed sequences, or in response to simple external stimuli, but they fail to disclose a mechanism for remote control of the lighting elements.

Various methods for incorporating general purpose computing devices into clothing are also known in the art, for example in U.S. Pat. No. 5,555,490, U.S. Pat. No. 6,243,870, U.S. Pat. No. 6,324,053, U.S. Pat. No. 6,381,482, U.S. Pat. No. 6,563,424 and U.S. Pat. No. 6,895,261. These all relate to the field of "wearable computing," where the intent is to distribute all the components of a computer—a processor, long term storage, a user interface, input devices, a communications module, etc.—throughout the various articles of clothing worn by a person. These methods are unsuitable for the present purpose for a number of reasons. They do not address the specific need of powering and controlling lighting elements. They also incorporate components that are not needed for the present purpose and merely make the resulting lighted garment bulkier and more fragile, when what is needed in the present domain is a garment and control system which minimally restricts movement and/or covering, while providing the maximum durability during sudden or intense movements, such as those that might occur during a dance sequence.

Conventional, i.e. non-wearable, lighting fixtures that have remote control capabilities are disclosed, for example, in U.S. Pat. No. 6,809,652, U.S. Pat. No. 6,517,216 and U.S. Pat. No. 7,027,736. These devices are generally unsuitable for the present purpose because they are not miniaturized or lightweight enough to be wearable, and because they are designed to control high power lights used to illuminate a scene from a distance, not lower power lights that can be worn on a person's body and are intended for direct viewing.

Examples of wireless lighting control systems and protocols known to the prior art shown, for instance, in U.S. Pat. No. 6,300,727, U.S. Pat. No. 6,548,967, U.S. Pat. No. 6,801,003, U.S. Pat. No. 7,126,291 and U.S. Pat. No. 7,748,878. None of the foregoing patents disclose lighting systems or methods for powering and remotely controlling low power wearable light units.

There exists a need for a light control system and method that provides wearable light units that are remotely controlled via Internet protocols and easily installed in various configurations on or into a variety of garment types, and affords a uniform method of controlling disparate types of lighting elements in such light units.

SUMMARY OF THE INVENTION

In the present invention, the foregoing purposes, as well as others that will be apparent, are achieved generally by providing a wireless lighting system comprising a plurality of wearable light units, each light unit comprising a plurality of lighting elements separately coupled to a control box and a central control unit programmed to obtain a set of lighting inputs and to wirelessly communicate with the control box of one or more of said plurality of light units in order to control the plurality of light units according to said set of lighting inputs. The central control unit is programmed to convert the set of lighting inputs into a set of commands, and transmit the commands wirelessly to one or more of the light units. The lighting inputs may be generated from command input units including a DMX bridge, an SMPTE bridge, a human operating a computer console, a set of commands stored in memory or an auxiliary input. For each wearable light units, input from one of the command units may be chosen. The control box in each of the light units comprises comprising a communication module for wirelessly communicating with the central control unit, a memory chip storing pre-programmed sequences for controlling the plurality of lighting elements in a desired manner, and software programmed to interpret command instructions received from the central control unit to direct the lighting elements according to the command instructions. The central control unit may comprise a timer and be programmed to send commands to each of the light units in a synchronous manner based on a rhythm generated from the timer output.

In another aspect of the invention, a removable connector is provided for coupling the plurality of lighting elements to the control box, the connector comprising a plurality of cavities on one side, at least one of which has a metal pressure clamp for securably receiving stripped wire ends of wires connected to the lighting elements, and a plurality of header pin holes on another side having metal contacts and positioned to receive a plurality of header pins in the control box to make an electrical connection between the lighting elements and the header pins.

A method of controlling a plurality of wearable light units with a control unit, each light unit comprising a plurality of lighting elements and a control box, is also provided, the method comprising: obtaining a set of lighting inputs, generating a plurality of commands from said set of lighting inputs, wirelessly transmitting said plurality of commands to said plurality of light units, and interpreting said plurality of commands to control said plurality of lighting elements.

Further embodiments, modifications, variations and enhancements are also described within. Other objects, features and advantages will become apparent when the detailed description of the preferred embodiments are considered in conjunction with the drawings which should be construed in an illustrative and not limiting sense as follows.

BRIEF DESCRIPTION OF THE DRAWINGS

FIG. 6A illustrates a sample sequence of lighting commands sent from a central control unit to wearable light units.

FIG. 6B illustrates detailed commands for each lighting element within multiple wearable light units in a wireless lighting system.

FIG. 7 illustrates example data provided as input to, and retrieved as output from, a DMX bridge.

FIG. 8 illustrates example data provided as input to, and retrieved as output from, an SMPTE bridge.

Reference will hereinafter be made to the drawings in which similar elements in different drawings bear the same reference numerals.

DETAILED DESCRIPTION OF THE INVENTION

Figure 1:
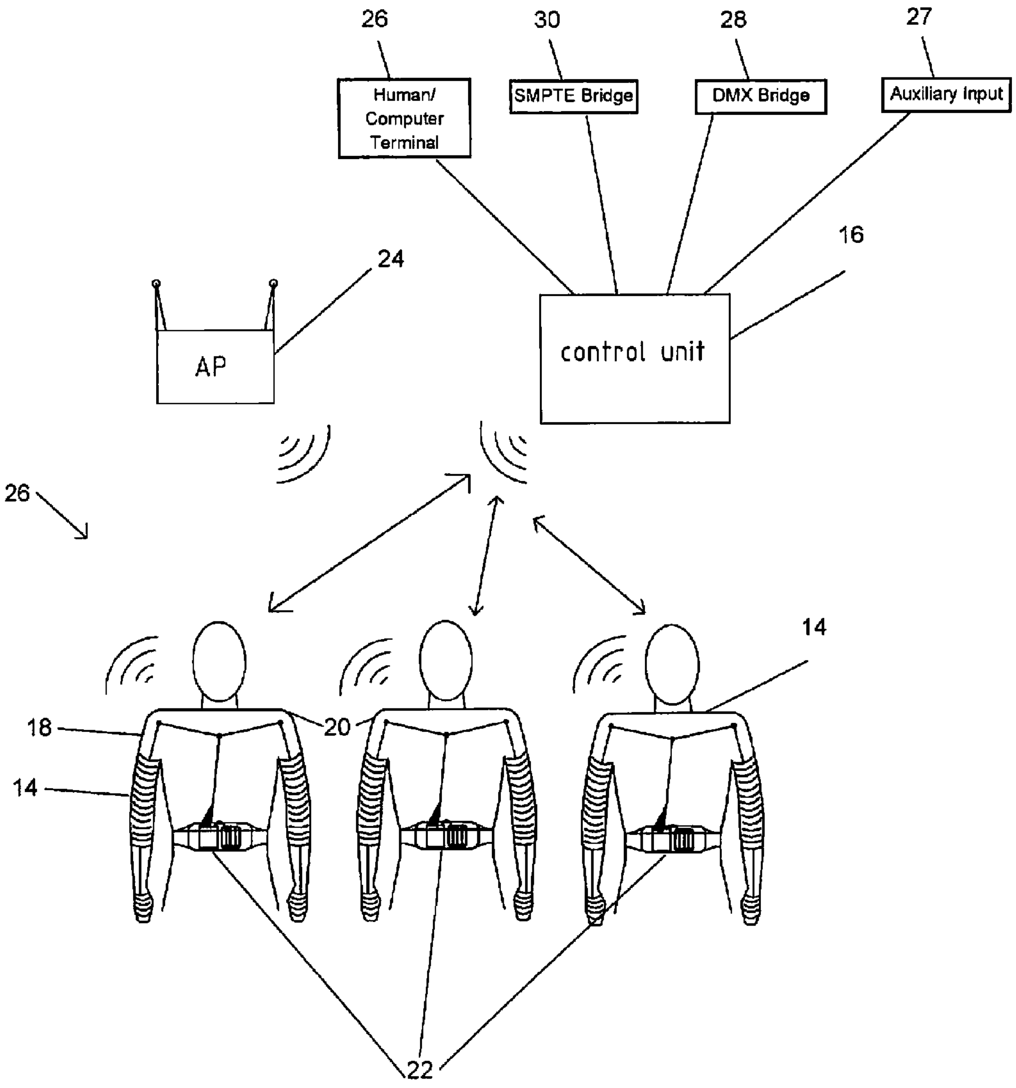
FIG. 1 illustrates an embodiment of a wireless lighting system.

In the following detailed description, certain preferred embodiments are described as illustrations of the invention in a specific application, network, or computer environment in order to provide a thorough understanding of the present invention. Those methods, procedures, components, or functions which are commonly known to persons of ordinary skill in the field of the invention are not described in detail as not to unnecessarily obscure a concise description of the present invention. Certain specific embodiments or examples are given for purposes of illustration only, and it will be recognized by one skilled in the art that the present invention may be practiced in other analogous applications or environments and/or with other analogous or equivalent variations of the illustrative embodiments.

Some portions of the detailed description which follows are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Aspects of the present invention, described below, are discussed in terms of steps executed on a computer system, which may be one of any type having suitable computing resources and configured to fetch, decode, and execute computer instructions. Aspects of the present invention are also discussed with respect to an Internet system including electronic devices and servers coupled together within the Internet platform, but it may be similarly implemented on any other type of extended network system including wireless data or digital phone networks. Although a variety of different computer systems can be used with the present invention, an exemplary computer system is shown and described in the preferred embodiments. As used herein, the term exemplary indicates an example and not necessarily an ideal.

A preferred embodiment for implementation of the invention is described below. The preferred embodiment is described as a set of lighted garments communicating with a central control unit. However, it should be understood that the lighting elements attached to the garment may be used in other contexts. For instance, lighting elements may be attached to motionless fixtures, or coupled to any other appropriate object.

The preferred embodiment generally facilitates a separation of concerns between the construction of lighted garments and their remote control function. A specific instance of a lighted garment may comprise a plurality of types of lighted elements distributed throughout the garment, some wired in series, and others wired in parallel. The wearable device in the preferred embodiment accommodates these different configurations via a rugged connector with a solder-free mechanism for attaching lead wires to the device. This rugged connector has other features that add to the convenient separation of these concerns: it securely latches to the header pins protruding from the device's enclosure, but can be quickly released for working with either the lighted garment or the wearable device individually. Software running on the wearable device also allows remote configuration of the power regulation module in order to repurpose it for use in a lighted garment with a different arrangement of lighting elements.

Software running on the wearable device provides a number of other features to the operator. It supports individually addressing each lighting output channel via remote commands in a uniform manner, so that, for instance, dimming the third channel of a garment comprised of EL wire elements to 50% brightness is accomplished by the same command that would be used to dim the third channel of a garment comprising 10 LEDs per channel to 50% brightness. A heterogenous network of wearable devices can thus be controlled in synchrony, either through the custom command protocol, or by a number of other standard control protocols when a separate translating device is present.

In the preferred embodiment, the software running on the wearable device also provides preprogrammed lighting effects for testing a lighted garment, or as an expedient measure in sequencing a lighting performance. The software and hardware together also provide self-diagnostic functions that can be used to monitor the performance of lighting elements and the power source and/or take action when certain conditions arise.

The wireless connections of the present disclosure also facilitate easy communication and coordination with various standard control systems, such as DMX and SMPTE. These systems provide control signals which help coordinate different types of systems. The present disclosure provides systems and methods for interpreting these control signals and directing lighting elements within the lighting system accordingly. The present disclosure also provides systems and methods for "selective listening" of control signals from different control systems, such that various elements within the lighting system may be controlled by different control systems. The wireless aspect of the lighting system assists in facilitating this selective listening functionality by providing wireless data transfer pathways which can transmit instructions from any such control system or from a central control unit.

FIG. 1 depicts a wireless lighted garment system 10 comprising a set 12 of wireless lighted garments 14 controlled by a centralized control unit 16. Each of the wireless lighted garments 14 contains one or more sets of lights 18 fastened to a garment 20 and connected to a garment control box 22. The central control unit 16 stores and/or receives instructions for directing lighting sequences for the sets of lights 18 in the wireless garments 14 and is programmed to generate and send commands based on those instructions to the garment control box 22 within each wireless lighted garment 14. Each garment control box 22 within the system 10 is programmed to receive and process commands from the control unit 16, and subsequently to direct control of the sets of lights 18 within each wireless lighted garment 14.

Control unit 16 may establish communication with the garment control boxes 22 through a variety of means, including establishing an 802.11 wireless network in the area, or establishing other types of communications networks.

If an 802.11 wireless network is used, control unit 16 and the control boxes 22 within each wireless lighted garment 14 associate with this wireless network and receive IP addresses on the local network segment. The control unit 16 may then send commands, for example, to each garment control box 22, either individually via TCP or UDP unicast, to all of the lighted garments 14 via UDP broadcast, or to only some of them via UDP multicast groups.

Control unit 16 may contain a wireless network communications device, or may be linked (via, e.g., an Ethernet connection), to a wireless access point 24, which facilitates access to the wireless network for the control unit 16. Control unit 16 may also be embodied as custom software running on a wireless access point 24 or on another device having wireless network capabilities.

On top of the network layer established between control unit and garment control boxes (e.g., TCP/IP), a "custom command protocol" is used to send operation-specific commands, such as commands related to lighting instructions, diagnostic commands, and other lighting system specific commands. This protocol will be discussed in further detail below.

Central control unit 16 may receive instructions from an outside source such as a human operating a computer console 26, a DMX bridge 28 or a SMPTE bridge 30.

DMX bridge 28 allows operation of the system via the DMX protocol and related equipment. DMX is a protocol customarily used for controlling lighting devices in which blocks of raw data are sent serially (sequentially in time) through a chain of connected lighting devices. Customarily, different portions of each data block in the DMX protocol correspond to different lighting devices in a linked chain. The DMX bridge 28 used in the system 10 accepts raw DMX data blocks and translates the raw DMX data into commands in the "custom command protocol"—the language used by the lighting system of this disclosure. The DMX bridge 28 is discussed in further detail below.

Similarly, the SMPTE bridge 30 allows operation of the system via the SMPTE protocol and related equipment. SMPTE is a system by which a central device sends "timecodes" to a variety of different devices. This protocol makes it possible to control disparate elements, such as music and lighting elements, via a central device, and allows changes to be made to pre-recorded sequences, such as changing tempo, rewinding and fast forwarding, and other changes. The SMPTE bridge 30 will be discussed in further detail below.

A human sitting at a computer terminal 26 may enter commands for the garments or for the system as a whole. An auxiliary input 27 may also provide input to the system, and may comprise any other device capable of providing information regarding lighting configurations.

Figure 2:
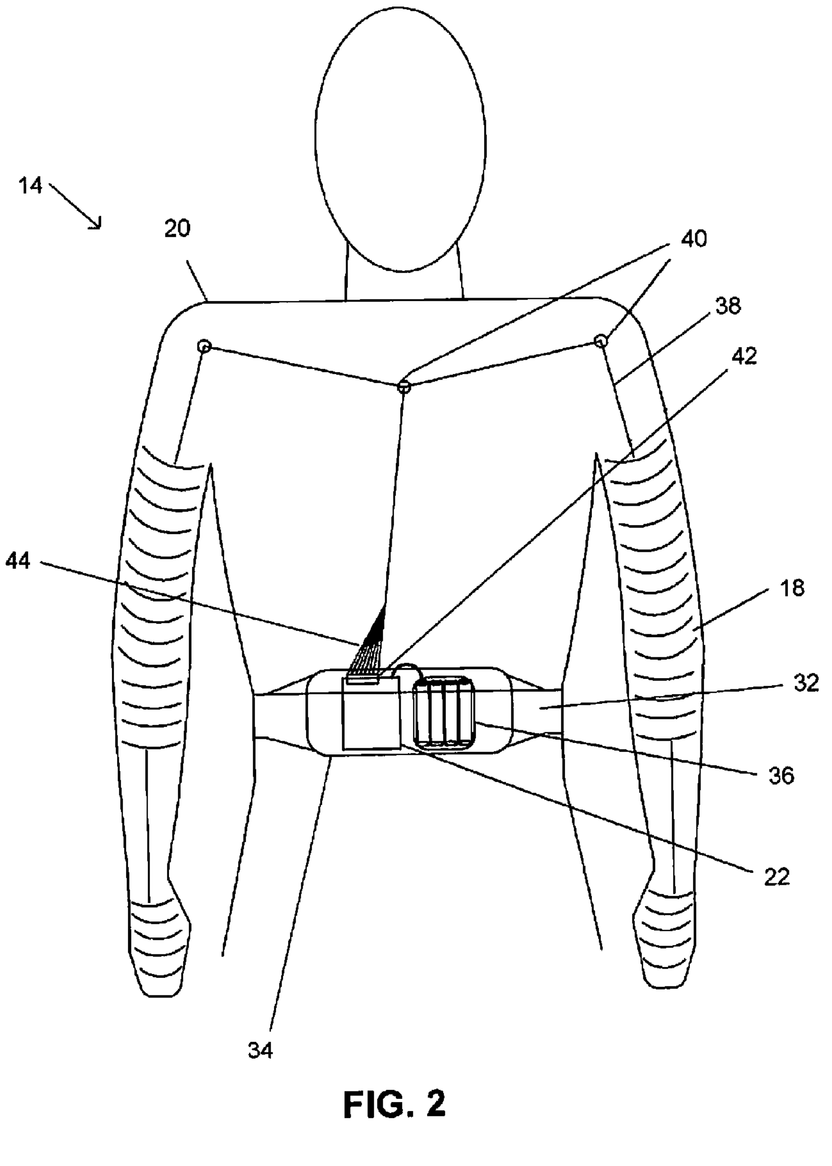
FIG. 2 illustrates an embodiment of a wireless lighted garment including a wearable light unit.

FIG. 2 depicts a wireless lighted garment 14. The garment comprises a fabric garment 20, a control box 22 which may be inserted into a belt 32 with pouch 34 fastened around a garment wearer's waist and a plurality of lights 18 affixed to the garment 20 at various locations, positioned to illuminate different locations on a wearer's body. The wireless lighted garment 14 may be powered by a battery pack 36 having, for example, standard AA batteries, and residing within the belt 32 with pouch 34.

The lighting elements 18 may be a set of lighted wires or strands, such as LyTec Electroluminescent wires by Electroluminescent Industries Ltd. of Jerusalem, Israel. These wires 18 may be woven into different parts of the garment 20 to form a desired lighting pattern. The lighted wires 18 have electrical wire 38 for connection to control box 22. These electrical wires 38 may be brought together at juncture points 40 and fed into a removable connector 42 for connection with control box 22.

Lead wires 44 from lighting elements 18 are clamped into the removable connector 42. The wires 44 are shown gathered together, and conveyed as bundled extender wire 38 to various juncture points 40 elsewhere in the lighted garment 14. At these juncture points 40 the extender wires 38 may either diverge further, or connect to a wire that includes one or more lighting elements 18.

Figure 3:
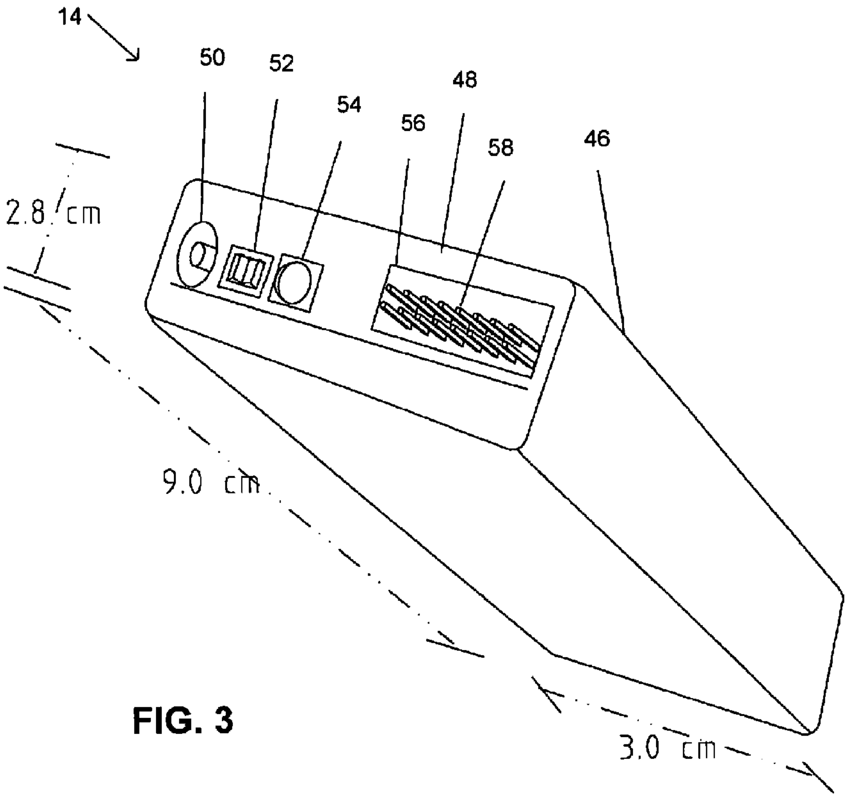
FIG. 3 is a perspective view of an embodiment of a control box for a wearable light unit.

FIG. 3 depicts an embodiment of the control box 22 for the lighted garment 14. Control box 22 is worn by the wearer of the garment 14, and contains electronics necessary for control of the lights 18 on the garment 14. Control box has a plastic enclosure 46 which protects the wearer from electrical shock and any heat produced by the electronic circuitry and protects the electronics from damage. One face 48 of the control box 22 has a power plug adaptor 50, power switch 52, system LED 54 and cavity 56 exposing header pins 58 protruding through the surface of the enclosure 46. The control box 22 also contains an electronics circuit board which has electronics for receiving commands and power and providing commands to the lighting elements 18 embedded in the garment 14. These components are described in further detail with reference to FIG. 4.

Figure 4:
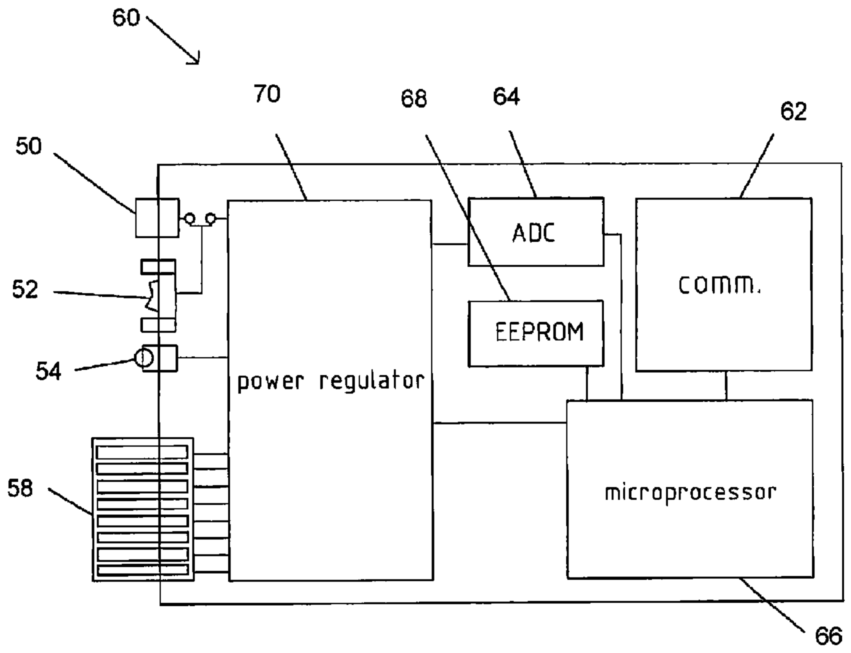
FIG. 4 is a block diagram showing an embodiment of a circuit board which is a component of the control box depicted in FIG. 3.

FIG. 4 depicts a detailed diagram of the circuit board 60 within the control box 22, including the various electronic control components providing communications and information processing functions.

The circuit board 60 contains a communications module 62 for wireless communications with the control unit 16, an analog-to-digital converter 64 for providing voltage data to a microprocessor 66 in digital form, an EEPROM chip 68 for storing configuration data for the control box, a power regulator module 70 for regulating power to components on the circuit board 60 and to lighting elements 68, a power plug adaptor 50 for receiving power from a power cable, a power switch 52, a system LED 54, and header pins 58 for coupling a removable connector to the control box 22.

Communications module 62 provides remote control and communications capability to the control box. Communications module may be a self-contained 802.11 wireless chip that communicates with the microprocessor 66 over a serial port, such as the Wiz610wi by Wiznet, the ZG2100 by ZeroG Wire-less, or the WiFly 802.11b Serial Module by Roving Networks.

The communications module receives packets from the wireless network and sends them to the microprocessor by writing those packets onto the serial pins in the serial port connection between the communications module and the microprocessor at an agreed upon data rate. The communications module similarly transmits data, by writing data received on the serial pins from the microprocessor to the IP network, typically to the IP address from which a packet has most recently been received.

The communications module 62 may also act as an 802.11 access point, allowing a single control unit to connect to control box as an 802.11 client. This can be desirable in situations where there is only one lighted garment to control, for instance when testing a new lighted garment, or in situations where it is not possible to establish an 802.11 network using a physically separate access point device.

Communications module 62 may also act as an 802.11 client, associating with a wireless network established by a physically separate access point device. This is desirable in situations where many lighted garments are controlled in synchrony. The communications module 62 may also be a Bluetooth module, or an IP-capable ZigBee module.

The microprocessor 66 coordinates control of the lighted garment. It is primarily responsible for parsing commands received from the control unit, through communications module 62, and controlling lighting elements by adjusting parameters of the power regulator module 50 in order to effect the desired changes to the output of the lighting elements in the garment. The microprocessor 66 is also responsible for a number of other functions, such as managing changes to lighting outputs, the timing of these changes, and receiving and responding to commands received via the communications module 62.

Non-volatile memory such as an EEPROM chip 68, may be provided. The EEPROM chip 68 stores configuration information that informs the behavior of the microprocessor 66. For instance, control box may be usable with garments having different configurations of lighting elements. The EEPROM may store parameters for each configuration of lighting elements, so that the control box may be easily switched between lighted garments.

The power regulator module 70 effects control of the lighting elements in a garment by managing the intake of power from the power source attached to the power plug adapter 50, and the output of power to the lighting elements. Power regulator module 70 is capable of controlling and powering a plurality of lighting elements in a garment.

The power regulator module 70 may be capable of powering various types of lighting elements, such as EL wires, LEDs, and other types, and may be capable of changing the intensity of the light emitted from these elements. The intensity of the light emitted from LEDs may be controlled through, for example, pulse-width modulation (PWM). For control of EL wire, which require high frequency, high voltage AC current, the power regulator module 70 transforms the low voltage DC current supplied by the power source attached to the power plug adapter 50 to the high frequency, high voltage AC current required by the EL wire. Such a conversion circuit is commonly known as an "inverter."

The analog-to-digital converter 64 (ADC) is used by the microprocessor 66 to measure voltage levels related to power regulation and critical to the functioning of the device. For instance, one input to the analog-to-digital converter 64 measures the power input from the power source attached to the power plug adapter 50, while another analog-to-digital converter 64 input measures the power output to the lighting elements 18. After normalizing voltage measurements, the microprocessor 66 program transmits warnings if these levels fall outside normal operating values, or may transmit the values in other informational messages. The microprocessor 66 may also instruct the power regulator to deliver constant output power levels to the lighting elements even as the power source is drained, which for instance enables consistent dimming of LEDs.

An external power source may be attached to the circuit board 60 via the power plug adapter 50. Preferably, the power plug adapter 50 securely fastens a plug from the power source to the board so that it cannot be accidentally removed during the course of sudden or intense movements.

The power switch 52 allows the external power source attached to the power plug adapter 50 to be connected or disconnected from the circuit board 60. In a preferred embodiment, the power switch 52 is a slightly recessed switch that cannot be accidentally altered by the wearer even during the course of sudden or intense movements.

The system LED 54 acts as a visual status indicator for the wearer or operator. In one configuration, the system LED 54 may be lit when power is applied to the board. This LED may also be used to transmit simple diagnostic messages and error conditions via predefined blink patterns.

Figure 5:
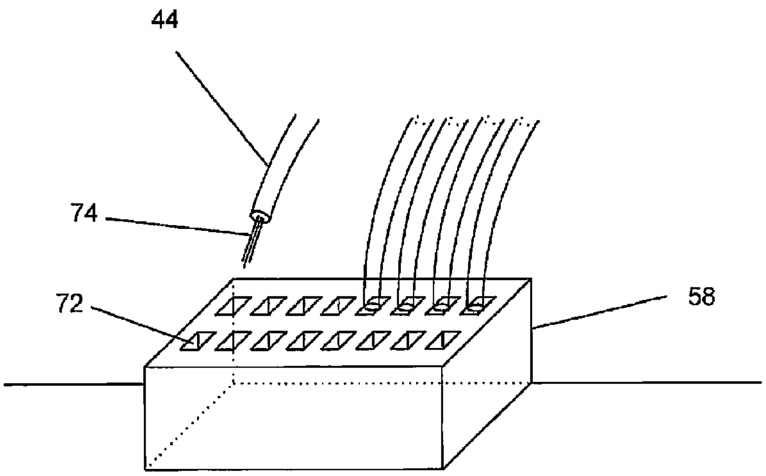
FIG. 5. is a perspective view of an embodiment of a removable connector for attaching wires from lighting elements to the control box of FIG. 3.

The header pins 58 couple the garment's lighting elements 18 to the board 60. Removable connector 42, illustrated in greater detail in FIG. 5, attaches to header pins 58, connecting lighting elements 18 to circuit board 60.

In a preferred embodiment, the removable connector 58 has a chamber 72 for each lighting output "channel." "Channels" refer to single or grouped lighting elements 18 that are controlled together. In preparation for usage of the lighted garments, wires from lighting elements 18 may be inserted into or removed from individual chambers 72. By permitting an operator to insert any lighting element into any chamber, on-the-fly custom configurations of lighted garments is facilitated.

Each chamber 72 accepts the stripped wire end 74 of a wire 44 connected to one or more lighting elements 18 and supplies current to one or more lighting elements 18 in the garment 14, which are then addressed and controlled in unison. This configuration permits different channels to be controlled differently. The amount of wire exposed on the stripped wire end 13 by removing the plastic housing should not exceed the depth of the chamber 11, in order to protect the wearer from electrical shock. Because soldering is generally not optimal if an operator desires to create on-the-fly garment lighting configurations, the connector allows wires to be inserted and removed without solder. A pressure clamp at the bottom of the chamber 72 is activated after the stripped wire end 74 has been inserted in order to secure the wire within the chamber. The pressure clamp is metal and completes the circuit. Once all wires are inserted into chambers 72 for the desired garment lighting configuration, the connector 42 is inserted into the cavity 56 within the control box 22. Each header pin 58 within the cavity 56 exposing the header pins 58 is matched to the conductive underside of a corresponding chamber 72 on the reverse side of the removable connector 42 of FIG. 5. This provides the connection between lighting elements 18 and control box 22.

One type of removable connector 42 suitable for use in an embodiment is a PTSM Terminal Block by Phoenix Contact.

The removable connector 42 may then be further secured to the header pins 58 extending from the board 60 via a latch mechanism. This latch prevents accidental removal during the course of sudden or intense movements. When the latch is open, the entire device can be quickly separated from the lighted garment, leaving the removable connector 42 attached to the garment. It is often useful to quickly separate the device from the lighted garment in this manner in order to perform diagnostics on either the device or the garment, or for the purposes of storing, transporting, or washing the garment.

Disclosure is now provided regarding operation of the system 10, including communication between the control unit 16 and the garment control boxes 22, and the "Custom Command Protocol", which is a custom system of communication by which the control unit 16 may issue lighting commands to the garment control boxes 22 attached to each garment 14. The custom command protocol includes commands that instruct specific lighting elements within each of the lighted garments to produce specific lighting effects. These lighting effects include effects such as setting lighting elements to a certain brightness, instructing lighting elements to produce standard lighting patterns, such as a strobe or a waterfall effect, or instructing the control box within the garment to direct the lighting elements within the garment to perform an effect pre-programmed into the control box. Such pre-programmed effects may be stored within the control box and identified with a specific identifier (for example, a specific pre-programmed sequence may be identified as sequence_001). Instructions for support of the system are also provided to assist with maintenance, testing and additional functionality for the lighted garments and garment control box.

The custom command protocol is implemented as a layer on top of a standard network communication protocol such as TCP/IP. The standard network communication protocol may be facilitated by a dedicated hardware device, such as the communications module 62 shown in FIG. 4, while the custom command protocol may be programmed into the firmware of both the control unit 16 and the control boxes 22.

Using the custom command protocol, the control unit 16 functions to direct control over the entire system, which may include one or more lighted garments. To do this, the control unit 16 determines a sequence of lighting "patterns" for the garments within the system and communicates these patterns in real time to each of the garments 14. The sequences may including information such as brightness levels for individual lighting elements, instructions to perform standard lighting effects such as a strobe or a waterfall effect, and instructions to perform a custom, pre-programmed lighting sequence. Control unit may also direct the control boxes to modify the illumination patterns by various parameters, such as speed, light intensity, changes in color, and other modifications.

A "pattern" comprises a set of specific lighting instructions for lighting elements 18 within a garment 14 (note that the term "pattern" may or may not indicate an actual data structure used by the system—however, data is depicted and described in this format in this description for clarity). The sequence of patterns may be determined and/or controlled dynamically or in real time—that is, controlled by a human user at a computer interface 26, or by another device, for example, the DMX bridge 28 or SMPTE bridge 30, or by other software, in real time. The sequence may also be pre-programmed into control unit 16 or into an external device. The sequence may be merged together from any of the above-listed inputs.

The control boxes within the lighted garments receive custom command protocol commands and function to control individual lighting elements on each of the garments. The garment control boxes may store various pre-programmed custom information, such as short sequences of illumination patterns, preferred lighting configurations, preferred illumination brightness, and other information. Upon accepting commands from the central control unit, the garment control box parses the commands and accesses any needed information stored in memory, and then activates the lighting elements according to the received instructions.

Interaction with the SMPTE bridge and DMX bridge will now be described in more detail.

SMPTE bridge is connected to a SMPTE system, which provides time codes to the lighting system and may provide the time codes to various other systems such as lights, music and other systems. Such time codes allow wireless lighting system to synchronize with these other systems that may be part of a performance, such as music and special effects. Control unit may receive SMPTE time codes, determine specific lighting sequences based on these time codes, and send the commands to wireless lighted garments. Use of these time codes also allows the wireless lighting system to easily move forward or backward to specific points of a performance, or to be played at a faster or slower tempo. Additional detail about operation of the system in conjunction with the SMPTE bridge is provided below in relation to FIG. 7.

DMX bridge allows the lighting system to accept commands from a DMX input system and to translate those commands to the "custom command protocol" used by the system. DMX is a system used for control of lighting in which raw data is provided in blocks of 512 bytes. Conventionally, the position of each byte within the blocks corresponds with a different lighting element within a system of lighting elements, while the value of each byte in the blocks correspond to brightness levels for each lighting element. Within the system, DMX can be used without regard to convention, and can be used to transmit raw data from a DMX controller outside of the system into the system.

The DMX bridge translates the raw data within the blocks into commands used by the system. By the convention used within the system, different bytes or blocks of bytes may be used to refer to different lighting elements and different lighted garments. For example, a first group of 10 bytes within the DMX block may correspond with a first lighted garment, a second group of 10 bytes may correspond with a second lighted garment, and so on. A specific group of bytes may correspond to a broadcast message, having commands sent to one or more of the lighted garments. If such a broadcast group is used, broadcast enabling bits or bytes may be used to indicate which garments will receive commands from the broadcast message and which will receive commands from the garment specific byte groups. Multiple byte groups may be designated for different broadcast groups, such as broadcast_1, broadcast_2, broadcast_3, each carrying a different group of commands. A control group may have bytes for enabling or disabling broadcast for various garments. Additional detail about operation of the system in conjunction with the SMPTE bridge is provided below in relation to FIG. 8.

The control unit also functions to coordinate lighting effects between systems. A synchronization function allows one or more of the lighted garments in the system to display identical lighting sequences in a synchronous manner, or allows the garments to display complementary lighting sequences to a unified rhythm. Synchronization is facilitated by two system features. First, the central control unit possesses a timing clock which dictates when commands are to be sent to each of the garment control boxes. By timing the issuance of lighting commands to the timing clock, all lighting commands issued to garment control boxes can be issued at the same, fixed rhythm. Second, the SMPTE bridge facilitates fine timing control of lighting sequences from outside the control box, and facilitates synchronization of the lighting effects both between all garments and with elements outside the lighting system that also receive and track SMPTE time codes. By receiving SMPTE time codes and directing commands corresponding to each time code, the system ensures commands are sent to the control boxes in synchrony with a global SMPTE timing system.

A more detailed explanation of the custom command protocol will now be provided with reference to an example of data sent by control unit via the custom command protocol shown in FIGS. 6A and 6B. FIG. 6A depicts a chart showing a sequence of commands sent for four different garments, labeled Garments 1-4 in the figure. The top row depicts "blocks" of the sequence, each of which corresponds to a different time period in a lighting sequence. The control unit proceeds through these blocks in sequence, and during each such time period, the control unit sends a set of commands to each garment control box, the commands including information for directing the lighting elements within each garment. The top row also shows a time stamp for each block. These time stamps indicate the temporal position of each block within a lighting sequence.

The left column shows references to the different garments in the system. If a network protocol is used, the garments may each have an IP address, shown in FIG. 6A as 10.0.0.101-10.0.0.104. Other identifiers for the garments are of course possible.

As can be seen, during each block of time, and for each garment, the central unit will send out a set of lighting commands to each garment. The central unit may either direct these commands to single garments or to multiple or all garments. In blocks 1 and 2, central unit broadcasts the same set of commands to all garments, while in the remaining blocks depicted, central unit sends different sets of commands to different garments individually. In the figures, the sets of lighting commands issued in each block are depicted as "patterns," which are shown in more detail in FIG. 6B.

FIG. 6B depicts "patterns" of lighting commands sent to each garment. These include instructions for each lighting element within a specific garment. The patterns shown in FIG. 6B may or may not represent actual data structures sent to each garment, but are depicted in this format in this disclosure for clarity. The depiction of example patterns in FIG. 6B assumes that each garment has only 4 lighting elements. Pattern A includes instructions to set lighting element 1 to brightness level 50, lighting element 2 to brightness level 150, lighting element 3 to brightness level 50, and lighting element 4 to strobe. Some patterns may comprise an instruction to play a pre-recorded sequence of lighting effects. These pre-recorded sequences of lighting effects are stored within the garment control boxes themselves (preferably in the EEPROM) and thus need not be commanded in full by the central unit. Central unit only needs to indicate to the garment control box that it should play, for example, "pre-recorded sequence 005", and the control box will retrieve this sequence from memory and direct the lighting elements accordingly.

FIG. 7 depicts an example set of data received by a DMX bridge, and the commands the data is translated into. A first table 702 depicts raw DMX data transmitted and a second table 704 depicts translated commands. This data is translated by the DMX bridge into custom command protocol commands which are sent to the control unit and transmitted to the garments where the commands are parsed and executed. The DMX bridge is provided so that commands for the system may be provided through equipment designed for the DMX system. Commands in the DMX format may be generated by any such equipment and sent to the DMX bridge where the commands are translated into a format usable by the lighting system of the present disclosure. It is contemplated that one such format is the custom command protocol described above.

Byte groups 706 are depicted in FIG. 7. These byte groups 706 represent portions of an entire DMX 512 byte block of raw data. For clarity, the entirety of such a block is not shown. However, it should be understood that any amount of each block may be used as needed. Raw data values 708 of each of the byte groups 706 are also shown. These raw data values 708 are translated into commands which are sent to the garments. One method by which to translate the data into commands is as follows. Each byte in a byte group may correspond to a different lighting element in the garment. The value of the byte may indicate brightness for each lighting element. Special reserved values may be used for other purposes, such as lighting effects or pre-programmed sequences.

One or more byte groups 706 may be designated for broadcast commands. If this function is enabled, these byte groups 706 provide command data for a broadcast group. One or more additional byte groups 706 may be designated for broadcast enable and can indicate which groups of garments may receive data from which broadcast groups.

FIG. 8 depicts an example set of data received by an SMPTE bridge, and the commands the data is translated into. The first table 802 indicates real time periods 804 (e.g., 0 seconds after start, 2 seconds after start, etc), and SMPTE time codes 806 received by the SMPTE bridge from external SMPTE system at each of those time periods 804. The time codes 806 correspond to portions of a lighting sequence. In the figure, they correspond to 2-second long portions, although any amount of time is possible.

When the SMPTE bridge receives a time code 806, it provides this time code to a translation module, in which custom commands for that time code 806 are stored, and retrieves custom command protocol commands for that time code 806. It then sends these commands to the control unit for further processing and eventually for sending corresponding commands to the garments. The second table 808 depicts a sequence of time codes and the corresponding commands 810 retrieved. The commands 810 are depicted in the same format as in FIG. 6B, that is, "patterns" of commands for each of the garments.

Figure 9:
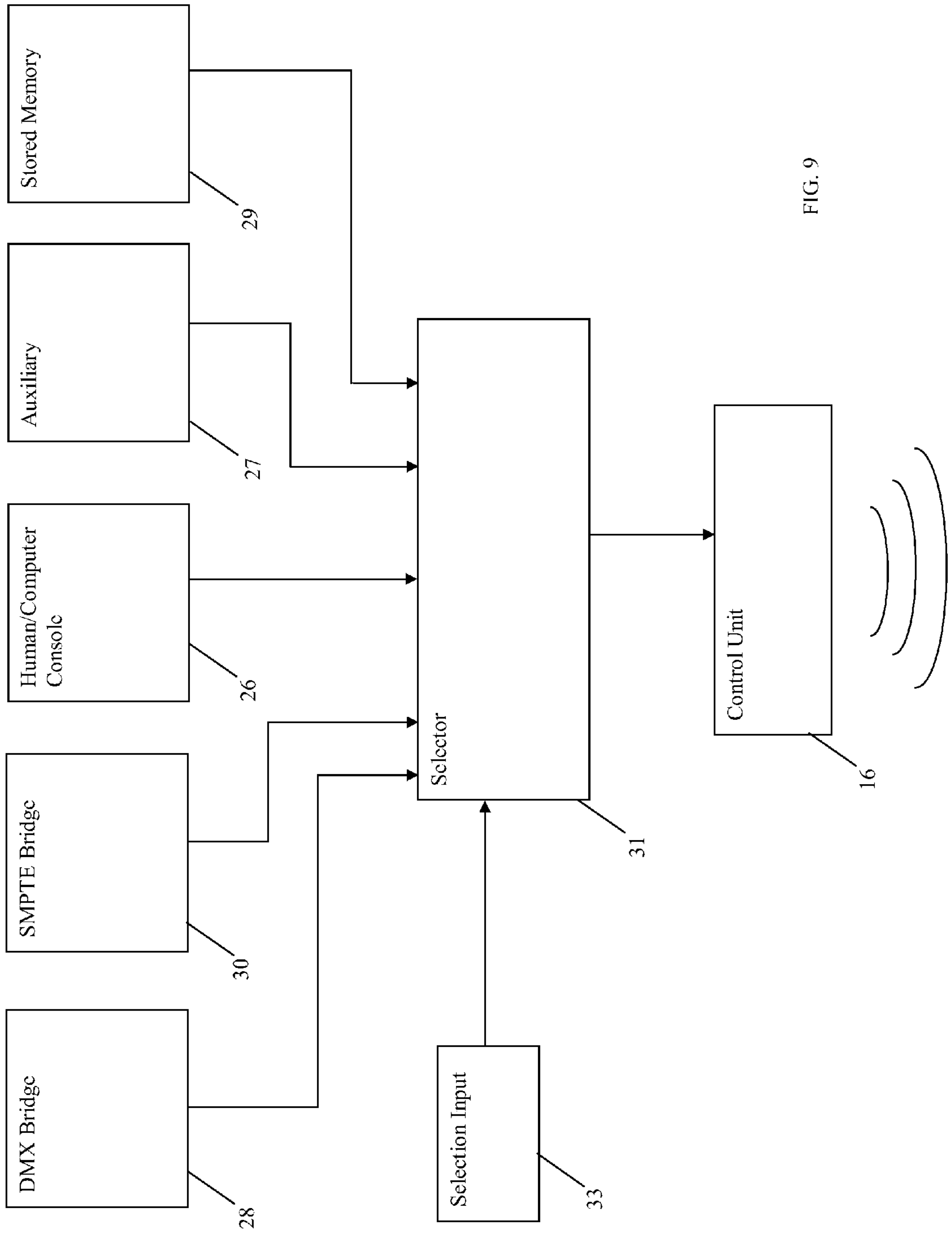
FIG. 9 is a block diagram showing an example input selector unit for selecting an input to provide commands to different wearable light units.

The control unit may enable and disable data received from any input for any or all wireless lighted garments on-the-fly, allowing real-time engagement and disengagement of the any input with any of the garments in the system. An example input selection system is shown in FIG. 9 in block diagram form. It should be noted that this system may be implemented as hardware or software, and that the selection system may be a part of the control unit, programmed into the same device as the control unit is programmed into, or may be a separate device or programmed into a separate device. The block diagram shown in this figure is merely exemplary and should not be taken to be limiting.

Inputs from input modules such as DMX bridge 28, SMPTE bridge 30, human input (human sitting at a computer console) 26, pre-programmed, pre-stored memory input 29, and auxiliary input 27 are shown. These all accept input in various formats (DMX bridge accepts DMX data, SMPTE bridge accepts time code, human input allows a human to enter commands to be converted to custom command protocol commands), and provide custom command protocol commands as output. These outputs are fed into a selector unit 31 which also accepts selection input 33. The selection input 33 is a set of data which decides which garments receive input from which input modules. Output from selector 31 may be subjected to further processing at control unit 16, and the processed data is sent wirelessly to the garments 14.

It should be recognized that any of the functionality described with respect to the various processing units, such as DMX bridge 28, the SMPTE bridge 30, the input selector 31 of FIG. 9, or any other input or system depicted and described above may be present and/or programmed into any of the hardware devices associated with the lighting system, such as the control unit or any software module associated with the system. Any of the functions of these processing units may be incorporated partially or wholly into the control unit or into any hardware or software the control unit is associated with.

The invention claimed and described herein is not to be limited in scope by the specific embodiments herein disclosed since these embodiments are intended as illustrations of several aspects of the invention. Indeed, various modifications of the invention in addition to those shown and described herein will become apparent to those skilled in the art from the foregoing description. For example, although the light units are intended to be wearable, they can be used in other applications, such as erecting a lighting design on a stationary object, such as a wall or column, or other movable or stationary items. Such modifications are also intended to fall within the scope of the appended claims. Several references are cited herein, the entire disclosures of which are hereby incorporated, in their entirety, by reference herein.

What is claimed is:

1. A wireless lighting system, comprising:

one or more wearable light units, each of the light units comprising a control box and a plurality of lighting elements removably incorporated into a garment, each of the lighting elements separately coupled to the wearable control box and grouped into a plurality of channels via a removable connector, the control box comprising a communications module for receiving from a central control unit and transmitting to the central control unit wireless signals over an internet protocol layer and means for testing the light units and generating status information;

the central control unit programmed to obtain a set of lighting inputs, convert the set of lighting inputs into a set of commands, and to wirelessly communicate over the internet protocol layer the set of commands to the control box of one or more of the light units in order to control the plurality of lighting elements according to the set of lighting inputs, to wireless communicate diagnostic commands over the internet protocol layer to the control box on one or more of the light units, and to wirelessly receive the status information from the control box over the internet protocol layer.

2. The wireless lighting system of claim 1, wherein each of the channels comprises one or more of the lighting elements, each of the lighting elements within each of the channels being controlled by said control box in unison.

3. The wireless lighting system of claim 1, wherein:

said central control unit is programmed to establish a wireless network connection with said light units.

4. The wireless lighting system of claim 1, wherein:

said central control unit comprises a timer generating a timing output; and said central control unit is programmed to send said commands to each of the light units in a synchronous manner, based on a rhythm generated from the timing output of said timer.

5. The wireless lighting system of claim 1, wherein:

said central control unit is programmed to periodically determine a plurality of command patterns, each of said command patterns within said plurality of command patterns being designated for a designated light unit within said light units, and to send each set of commands to the designated light unit within said light units.

6. The wireless lighting system of claim 1, wherein:

said set of lighting inputs comprises a plurality of data streams, at least two data streams in said plurality of data streams corresponding to a single light unit within said light units, said at least two data streams originating from different command input units; and said system further comprises a selector module programmed to receive a selector input, and for each light unit within said lighting units to which at least two data streams in said plurality of data streams corresponds, select one of said at least two data streams for said light unit based on said selector input.

7. The wireless lighting system of claim 6, wherein:

said command input units comprise a DMX bridge, an SMPTE bridge, a human operating a computer console, a set of commands stored in a memory, and an auxiliary input.

8. The wireless lighting system of claim 1, wherein:

the control box in each of the light units further comprises a memory chip storing pre-programmed sequences for controlling said plurality of lighting elements in a desired manner, and firmware programmed to interpret the commands received from said central control unit and to direct the lighting elements according to the commands.

9. The wireless lighting system of claim 1, wherein the status information comprises self-diagnostic information, battery power information and timing calibration information.

10. The wireless lighting system of claim 1, wherein the internet protocol layer is selected from the group consisting of IPv4, IPv6, IPsec, TCP/IP and UDP.

11. The wireless lighting system of claim 1, wherein the removable connector comprises a plurality of cavities, at least one of which has a metal pressure clamp for securing stripped wire ends of wires connected to the plurality of lighting elements therein, each of the cavities representing one of the channels and comprising one or more of the lighting elements, each lighting element within each of the channels being controlled by the control box in unison.

12. The wireless lighting system of claim 11, wherein the control box further comprises a plurality of header pins, and the removable connector further comprises a plurality of header pin holes positioned on the side of the removable connector opposite to the plurality of cavities, the plurality of header pin holes having metal contacts and positioned to receive the plurality of header pins such that an electrical connection is made between the plurality of lighting elements and the plurality of header pins.

13. The wireless lighting system of claim 1, wherein the lighting elements are configurable in various configurations.

14. A method of providing a garment with wirelessly controlled lighting effects comprising:

removably incorporating a control box and a plurality of lighting elements into the garment;

separately coupling each of the lighting elements to a removable connector in a plurality of channels;

removably coupling the removable connector to the control box;

establishing a wireless network connection between the control box and a central control unit for transmitting wireless signals from the control box to the central control unit and from the central control unit to the control box over an internet protocol layer;

obtaining a set of lighting inputs in the central control unit;

converting the set of lighting inputs into a set of commands;

wirelessly communicating over the internet protocol layer the set of commands from the central control unit to the control box in order to control the plurality of lighting elements according to the set of lighting inputs;

wirelessly communicating diagnostic commands over the internet protocol layer from the central control unit to the control box;

testing the control box and the plurality of lighting elements, and generating status information; and wirelessly receiving the status information in the central control unit from the control box over the internet protocol layer.

15. The method of claim 14, wherein the step of obtaining a set of lighting inputs comprises obtaining a plurality of data streams, at least two data streams in said plurality of data streams corresponding to the control box, said at least two data streams originating from different command input units;

the method further comprising:

receiving a selector input, selecting one of said at least two data streams based on said selector input;

generating a plurality of commands from a selected one of said at least two data streams;

wirelessly transmitting said plurality of commands to said control box; and interpreting said plurality of commands to control said plurality of lighting elements.

16. The method of claim 15, wherein said plurality of commands comprises commands to adjust the brightness of said plurality of lighting elements.

17. The method of claim 15, wherein:

said plurality of commands comprises commands to play lighting sequences pre-recorded into a memory unit in the control box.

18. The method of claim 15, further comprising:

generating a timing output; and sending commands to the control box in a synchronous manner, based on a rhythm generated from said timing output.

19. The method of claim 15, further comprising:

retrieving a current index;

providing said current index to a memory correlating indices with command patterns; and retrieving a command pattern correlated with said current index.

* * * * *